(12) United States Patent
Batshon et al.

(10) Patent No.: US 9,337,935 B2
(45) Date of Patent: May 10, 2016

(54) CODED MODULATION FOR SMALL STEP-SIZE VARIABLE SPECTRAL EFFICIENCY

(71) Applicant: Tyco Electronics Subsea Communications LLC, Eatontown, NJ (US)

(72) Inventors: Hussam G. Batshon, Eatontown, NJ (US); Hongbin Zhang, Marlboro, NJ (US); Alexei N. Pilipetskii, Colts Neck, NJ (US)

(73) Assignee: TYCO ELECTRONICS SUBSEA COMMUNICATIONS LLC, Eatontown, NJ (US)

(*) Notice: Subject to any disclaimer, the term of this patent is extended or adjusted under 35 U.S.C. 154(b) by 0 days.

(21) Appl. No.: 14/102,990

(22) Filed: Dec. 11, 2013

(65) Prior Publication Data

US 2015/0071640 A1  Mar. 12, 2015

Related U.S. Application Data

(63) Continuation-in-part of application No. 14/020,861, filed on Sep. 8, 2013.

(51) Int. Cl.
*H04B 10/516* (2013.01)
*H04J 14/02* (2006.01)
*H04L 1/00* (2006.01)

(52) U.S. Cl.
CPC ........ *H04B 10/5161* (2013.01); *H04J 14/0257* (2013.01); *H04L 1/0056* (2013.01); *H04L 1/0058* (2013.01); *H04L 1/0063* (2013.01)

(58) Field of Classification Search
CPC .................. H04B 10/5161; H04J 14/0257
USPC .......................................... 398/91
See application file for complete search history.

(56) References Cited

U.S. PATENT DOCUMENTS

| | | |
|---|---|---|
| 6,034,996 A | 3/2000 | Herzberg |
| 6,195,396 B1 | 2/2001 | Fang et al. |
| 6,259,743 B1 | 7/2001 | Garth |
| 6,473,878 B1 | 10/2002 | Wei |

(Continued)

FOREIGN PATENT DOCUMENTS

EP  1835625  3/2014

OTHER PUBLICATIONS

Xue Wei1,2, Yang Xiaoniu1, Zhang Zhaoyang2, A Variable Step Size Blind Equalization Algorithm for QAM Signals,ICMMT 2010 Proceedings,978-1-4244-5708-3/10/$26.00 ©2010 IEEE, pp. 1801-1803.*

(Continued)

*Primary Examiner* — David Payne
*Assistant Examiner* — Omar S Ismail

(57) ABSTRACT

A system and method involving a coded modulation scheme whereby different spectral efficiencies can be achieved for different transmitters in a WDM system using the same $M^2$-QAM modulation format. A maximum achievable spectral efficiency for the transmitters may be selected and a spectral efficiency step-size of the maximum achievable spectral efficiency may be specified. The spectral efficiency for any transmitter in the system may be individually selected by reducing its spectral efficiency from the maximum achievable spectral efficiencies by a selected number of steps corresponding to the step size.

12 Claims, 10 Drawing Sheets

(56) References Cited

U.S. PATENT DOCUMENTS

| | | |
|---|---|---|
| 6,622,277 B1 | 9/2003 | Ramanujam et al. |
| 6,904,087 B2 | 6/2005 | Li |
| 6,944,235 B2 | 9/2005 | Ophir |
| 7,116,724 B2 | 10/2006 | You |
| 7,613,253 B2 | 11/2009 | Weinholt |
| 7,778,341 B2 | 8/2010 | Tong et al. |
| 8,234,538 B2 | 7/2012 | Djordjevic et al. |
| 8,255,763 B1 | 8/2012 | Yang et al. |
| 8,295,713 B2 | 10/2012 | Cai |
| 8,301,967 B2 | 10/2012 | Bhaskaran et al. |
| 8,775,892 B2 | 7/2014 | Zhang et al. |
| 8,924,823 B2 | 12/2014 | Zhang et al. |
| 2002/0166091 A1 | 11/2002 | Kidorf et al. |
| 2004/0010747 A1 | 1/2004 | Hewitt et al. |
| 2005/0166132 A1 | 7/2005 | Shen et al. |
| 2005/0278607 A1 | 12/2005 | Garodnick |
| 2006/0031737 A1 | 2/2006 | Chugg et al. |
| 2007/0118787 A1* | 5/2007 | Schmidt ............... H03M 13/255 714/752 |
| 2008/0273614 A1 | 11/2008 | Heegard et al. |
| 2009/0150746 A1 | 6/2009 | Chaichanavong et al. |
| 2010/0040163 A1 | 2/2010 | Caire et al. |
| 2010/0146363 A1 | 6/2010 | Birru et al. |
| 2010/0169738 A1 | 7/2010 | Wu et al. |
| 2011/0150503 A1* | 6/2011 | Winzer ................... H04B 10/60 398/202 |
| 2012/0072802 A1 | 3/2012 | Chinnici et al. |
| 2012/0079341 A1 | 3/2012 | Wajcer et al. |
| 2012/0082459 A1 | 4/2012 | Wu et al. |
| 2012/0189303 A1 | 7/2012 | Winzer et al. |
| 2012/0242518 A1 | 9/2012 | Martin |
| 2012/0269512 A1 | 10/2012 | Koley et al. |
| 2013/0002962 A1 | 1/2013 | Limberg |
| 2013/0215996 A1* | 8/2013 | Boutros ............ H03M 13/1102 375/295 |
| 2013/0216221 A1* | 8/2013 | Zhang ................... H04L 1/0057 398/43 |
| 2014/0068385 A1 | 3/2014 | Zhang et al. |
| 2014/0153672 A1 | 6/2014 | Zhang et al. |
| 2014/0281832 A1 | 9/2014 | Zhang et al. |

OTHER PUBLICATIONS

Wei, A variable Step Size Blind Equalization Algorithm of QAM Signals, ICMMT—2010 Proceedings 2010—IEEE.*

Nabil Muhammad, Coding and Modulation for Spectral Efficient Transmission—Dissertation—University of Stuttgart—Germany—Jul. 20, 2010.*

International Search Report, International Application No. PCT/US2014/068257, International Filing Date Dec. 3, 2014.

Gho et al., "Rate-Adaptive Modulation and Coding for Optical Fiber Transmission Systems", Journal of Lightwave Technology, IEEE Service Center, New York, NY US, vol. 30, No. 12, Jun. 1, 2012, pp. 1818-1828.

J.K. Fischer et al., Bandwidth-Variable Transceivers Based on 4D Modulation Formats for Future Flexible Networks, Optical Communication (ECOC 2013), 39th European Conference and Exhibition on. IET, 2013, 3 pages.

J. Renaudier et al., Experimental Transmission of Nyquist Pulse Shaped 4-D Coded Modulation using Dual Polarization 16QAM Set-Partitioning Schemes at 28 Gbaud, Optical Communication (ECOC 2013), 39th European Conference and Exhibition on. IET, 2013, 3 pages.

R. Rios-Muller et al., Experimental Comparison between Hybrid-QPSK/8QAM and 4D-32SP-16QAM Formats at 31.2 GBaud using Nyquist Pulse Shaping, Optical Communication (ECOC 2013), 39th European Conference and Exhibition on. IET, 2013, 3 pages.

Zhou et al., 12,000 km Transmission of 100GHz Spaced, 8x495-Gb/s PDM Time-Domain Hybrid QPSK-8QAM Signals. Optical Fiber Communication Conference. Optical Society of America, 2013, 3 pages.

International Search Report dated Jun. 23, 2014 for International Application No. PCT/US2014/022401.

Krishna Sankar; "Binary to Gray Code for 16QAM"; Jun. 1, 2008; printed at http://www.dsplog.com/2008/06/01/binary-to-gray-code-for-16qam/ on Feb. 13, 2012.

Office Action dated Sep. 25, 2014 received in U.S. Appl. No. 13/569,628.

Norifumi et al., "Concatenated QC-LDPC and SPC Codes for 100 Gbps Ultra Long-Haul Optical Transmission Systems," OSA (2010) 3 pages.

International Search Report dated Apr. 11, 2014 for International Application No. PCT/US2013/054819.

International Search Report dated Apr. 12, 2013 for International Application No. PCT/US2013/024014.

Batshon et al., "Multidimensional SPC-Based Bit-Interleaved Coded-Modulation for Spectrally-Efficient Optical Transmission Systems," International Society Optical Engineering (2013) 6 pages.

Tee et al., "Multiple Serial and Parallel Concatenated Single Parity-Check Codes," IEEE Transactions on Communications (2003) 51(10):1666-1675.

Chouly et al., "Six-Dimensional Trellis-Coding with QAM Signal Sets," IEEE Transactions on Communications (1992) 40(1):24-33.

International Search Report dated Nov. 7, 2014 for International Application No. PCT/US2014/053116.

OfficeA dated Dec. 19, 2013 received in U.S. Appl. No. 13/569,628.

Zhang et al. "16QAM Transmission with 5.2 Bits/s/Hz Spectral Efficiency Over Transoceanic Distance," Optics Express 11688-11693.

Zhou et al., "12,000 km Transmission of 100GHz Spaced, 8x495-Gb/s PDM Time-Domain Hybrid QPSK-8QAM Signals," Optical Fiber Communications Conference. Optical Society of America, 2013, 3 pages.

Fischer et al., Bandwidth-Variable Transceivers Based on 4D Modulation Formats for Future Flexible Networks, Optical Communication (ECOC 2013), 39th European Conference and Exhibition on IET, 2013, 3 pages.

Renaudier et al., Experimental Transmission of Nyquist Pulse Shaped 4-D Coded Modulation using Dual Polarization 16QAM Set-Partitioning Schemes at 28 Gbaud Optical Communication (ECOC 2013), 39th European Conference and Exhibition on IET, 2013, 3 pages.

Cai "100G Transmission Over Transoceanic Distance with High Spectral Efficiency and Large Capacity," Journal of Lightwave Technology, IEEE Service Center, New York, NY, US, (2012) 30(24):3845-3856.

Guo et al., "Performance Analysis of PA Coded Pulse-Position Modulation for Space Optical Communications," Information Engineering and Computer Science (2010) pp. 1-3.

Cai et al., "On the Bit-Error Rate of Product Accumulate Codes in Optical Fiber Communications," Journal of Lightwave Technology (2004) 22(2):640-646.

Siegel et al., "Serial Concatenated TCM with an Inner Accumulate Code-Part II: Density-Evolution Analysis," IEEE Transactions on Communications (2005) 53(2):252-262.

Wang et al. "Low-Density Parity-Check Accumulate Codes," Information Theory and its Applications (2010) pp. 7-12.

Zhang et al; "Single Parity Check Bit Interleaved Coded Modulation with Iterative Decoding"; 8 pages.

Zhang et al, "Square Modulus Algorithm for Blind Equalization and Carrier Phase Recovery in a 16-QAM Optical Coherent System"; 6 pages.

Alex Alvarado; "On Bit-Interleaved Coded Modulation with QAM Constellations"; Chalmers; Department of Signals and Systems; Communication Systems Group, Chalmers University of Technology; Goteborg, Sweden, May 2008, 52 pages.

Charan Langton, Editor; "Signal Processing & Simulation Newsletters"; Jul. 1999; 27 pages; http://www.complextoreal.com/convo.htm printed Feb. 9, 2012.

Chip Fleming; "A Tutorial on Convolutional Coding with Viterbi Decoding"; Spectrum Applications; Updated Jun. 21, 2011; printed at http://pw1.netcom.com/~chip.f/viterbi/tutorial.html on Feb. 9, 2012; 5 pages.

"Gray Code"; Wikipedia; printed Feb. 13, 2012; 16 pages.

"Convolutional Code"; Wikipedia; printed Feb. 9, 2012; 7 pages.

* cited by examiner

CODED MODULATION FOR SMALL STEP-SIZE VARIABLE SPECTRAL EFFICIENCY

CROSS-REFERENCE TO RELATED APPLICATIONS

The present application is a continuation-in-part of U.S. patent application Ser. No. 14/020,861 filed Sep. 8, 2013, the entire disclosure of which is hereby incorporated herein by reference.

TECHNICAL FIELD

The present disclosure relates to optical signal data detection and more particularly, to a system and method using coded modulation for small step-size variable spectral efficiency.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data, e.g. using coherent detection and digital signal processing (DSP).

One type of modulation that may be used in optical communication systems is phase shift keying (PSK). According to different variations of PSK, data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of PSK and DPSK formats, such as return-to-zero DPSK (RZ-DPSK) and polarization division multiplexed QPSK (PDM-QPSK).

A modulation format, such as QPSK wherein multiple information bits are to be encoded on a single transmitted symbol may be generally referred to as a multi-level modulation format. Multi-level modulation techniques have been used, for example, to allow increased transmission rates and decreased channel spacing, thereby increasing the spectral efficiency (SE) of each channel in a WDM system. One spectrally efficient multi-level modulation format is quadrature amplitude modulation (QAM). In a QAM signal, information is modulated using a combination of phase shift keying and amplitude shift keying, for example, to encode multiple bits per symbol. For any given $M^2$-QAM where M is a positive integer, each symbol represents $\log_2(M^2)$ bits. For example, a 16-QAM modulation format may be used to encode 4 bits per symbol and 64-QAM may be used to encode 6 bits per symbol. PSK modulation schemes (e.g., BPSK and QPSK) may be referred to as a level of QAM (e.g., 2QAM and 4QAM respectively).

QAM schemes are useful in realizing flexi-rate transponder technology wherein multiple data rates may be achieved over the same bandwidth (or symbol rate) using different SE. In one approach, switching from one SE to another may be achieved by switching between different QAM formats. Although this approach may perform well, it can be limited by a coarse step in achievable bitrates and transmission distances. Switching from 16-QAM to 8-QAM for example will cause a reduction of 25% of the total information bit rate to perhaps provide about an 80% increase in transmission distance. Switching from 16-QAM to QPSK on the other hand will cause a reduction of 50% of the total information bit rate to perhaps provide about 330% increase in transmission distance.

BRIEF DESCRIPTION OF THE DRAWINGS

Reference should be made to the following detailed description which should be read in conjunction with the following figures, wherein like numerals represent like parts:

FIGS. 5A-5E each includes four constellation diagrams illustrating potential constellation points associated with one example consistent with the present disclosure.

DETAILED DESCRIPTION

In general, a system and method consistent with the present disclosure involves a coded modulation scheme whereby different spectral efficiencies can be achieved for different transmitters in a WDM system using the same $M^2$-QAM modulation format. A maximum achievable spectral efficiency, e.g. bit rate, for the transmitters may be selected and a spectral efficiency step-size of the maximum achievable spectral efficiency may be specified. The spectral efficiency for any transmitter in the system may be individually selected by reducing the spectral efficiency of the transmitter from the maximum achievable spectral efficiency by a selected number of steps corresponding to the step size. A number of encoding bits equal to the selected number of steps may be inserted into a data stream to establish blocks of bits at the transmitter. The encoding bits may be one or more parity bits indicating a parity of at least a portion of the block bits, or a combination of parity bits and one or more constant value bits. Each of the blocks of bits are Gray mapped to associated $M^2$-QAM symbols that are modulated onto an optical carrier and transmitted to a receiver.

Figure 1:
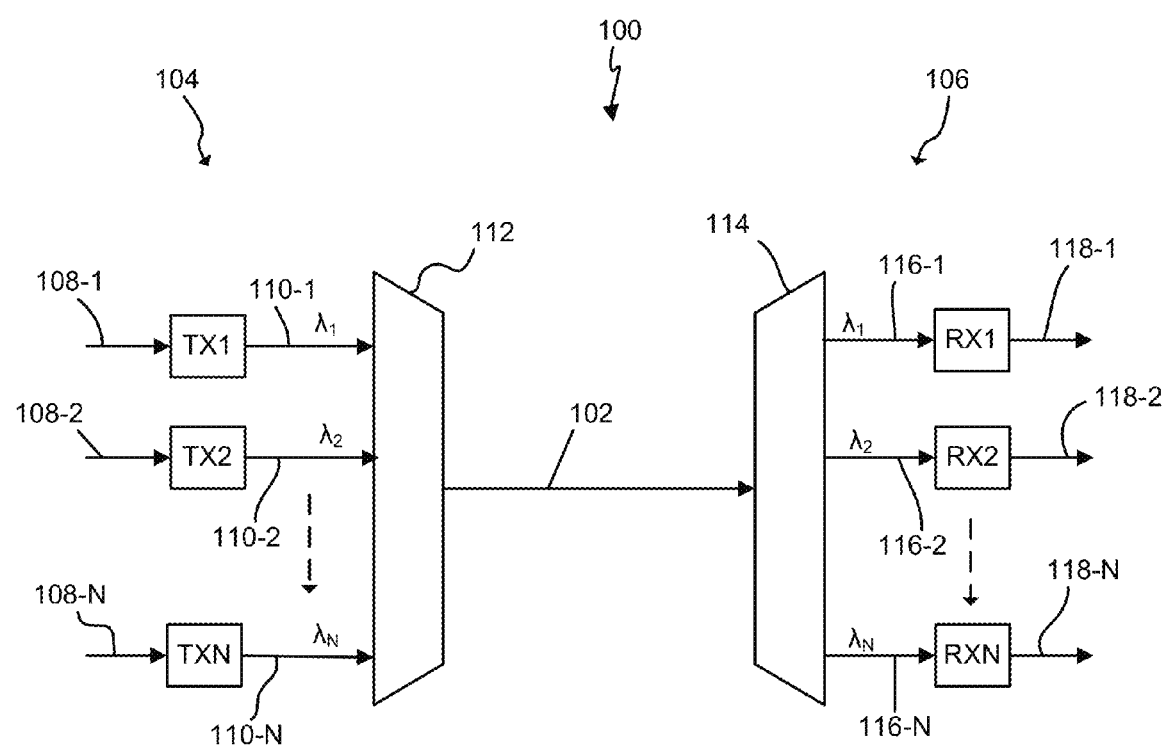
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 ... TXN receives a data signal on an associated input port 108-1, 108-2 ... 108-N, and transmits the data signal on an associated wavelength $\lambda_1$, $\lambda_2 \ldots \lambda_N$. The transmitters TX1, TX2 ... TXN may be configured to modulate data on its associated wavelength $\lambda_1$, $\lambda_2 \ldots \lambda_N$ using an associated spectral efficiency in a variable spectral efficiency configuration consistent with the present disclosure. The transmitters TX1, TX2 ... TXN, of course, are shown in highly simplified form for ease of explanation. Those skilled in the art will recognize that each transmitter TX1, TX2 ... TXN may include electrical and optical components configured for transmitting the data signal at its associated wavelength $\lambda_1, \lambda_2 \ldots \lambda_N$ with a desired amplitude and modulation.

The transmitted wavelengths $\lambda_1, \lambda_2 \ldots \lambda_N$ or channels are respectively carried on a plurality of paths 110-1, 110-2 ... 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 ... 116-N coupled to associated receivers RX1, RX2 ... RXN. One or more of the receivers RX1, RX2 ... RXN may be configured to demodulate the transmitted signal using iterative decoding and may provide an associated output data signal on an associated output path 118-1, 118-2, 118-3, 118-N.

Figure 2:
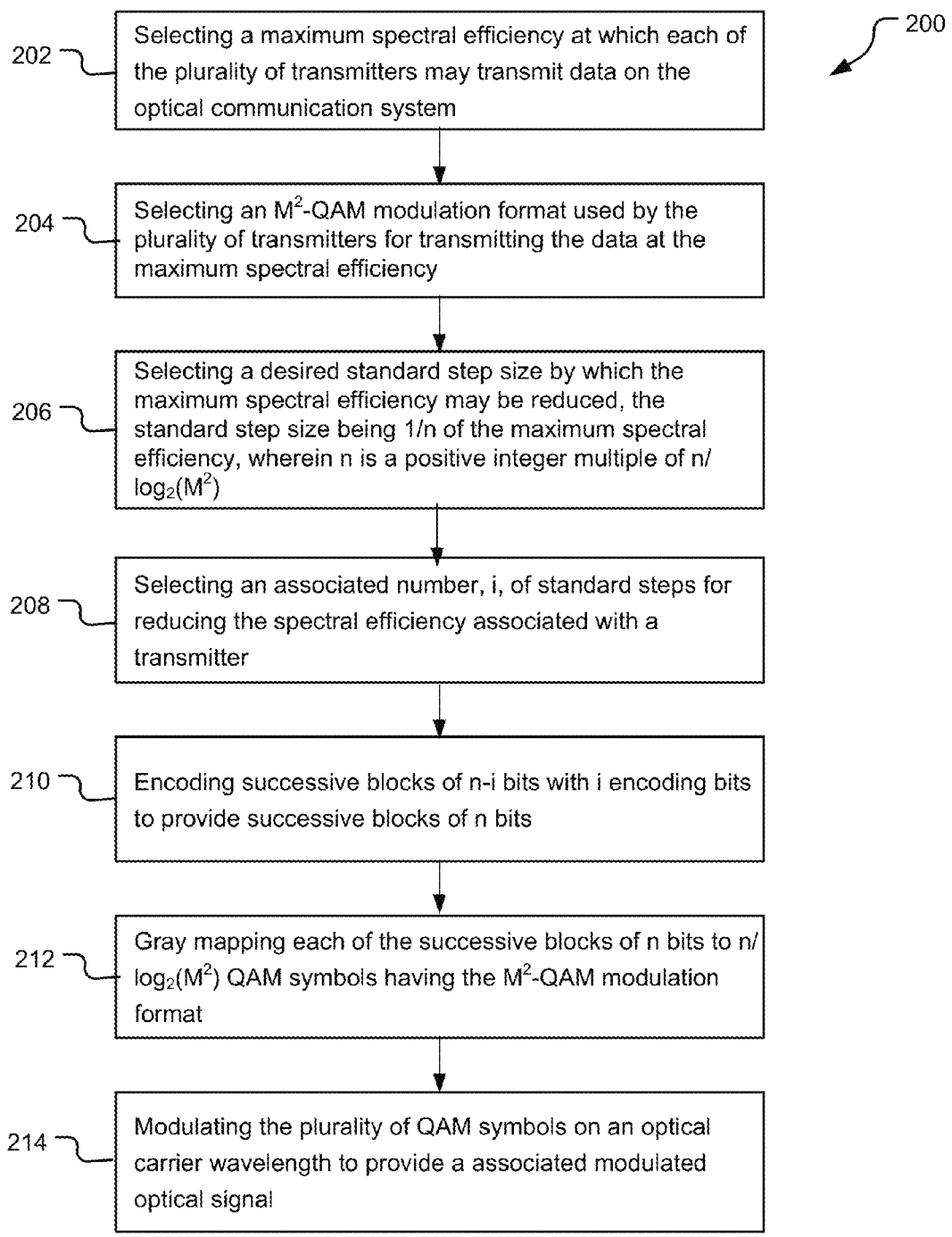
FIG. 2 is flow chart illustrating one example of a method consistent with the present disclosure.

In general, in a system or method consistent with the present disclosure, all the transmitters TX1, TX2 ... TXN may be configured to use a common $M^2$-QAM modulation format, baud rate (symbol rate) and forward error correction (FEC) scheme, but the spectral efficiencies of one or more of the transmitters TX1, TX2 ... TXN may be reduced compared to a maximum achievable spectral efficiency by one or more step sizes. FIG. 2, for example, is a flow chart illustrating a method 200 consistent with the present disclosure. While FIG. 2 illustrates various operations according to an embodiment, it is to be understood that not all of the operations depicted in FIG. 2 are necessary for other embodiments. Indeed, it is fully contemplated herein that in other embodiments of the present disclosure, the operations depicted in FIG. 2, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

In operations 202, 204, and 206, respectively, a maximum achievable spectral efficiency (e.g. bit rate), an $M^2$-QAM modulation format, and a desired standard step-size, 1/n, by which the maximum achievable spectral efficiency may be reduced are selected for the transmitters. The value of n, which determines the step size, may be a positive integer multiple of $\log_2(M^2)$, which is the number of bits represented by each symbol in an $M^2$-QAM modulation format.

For each transmitter in the system, an associated number, i, of standard steps for reducing the spectral efficiency of the transmitter from the maximum achievable spectral efficiency may be selected 208. Successive blocks of n-i bits may be encoded 210 with a number, i, of encoding bits equal to the selected number of steps to produce blocks of n bits (n-i information bits, plus i encoding bits associated with the n information bits). Each of the successive blocks of n bits are Gray mapped 212 to $n/\log_2(M^2)$ associated $M^2$-QAM symbols that are modulated 214 onto an optical carrier to provide a modulated optical signal for transmission to a receiver. As used herein a "Gray map" or "Gray mapping" refers to the known Gray mapping scheme whereby a code is assigned to each of a contiguous set of bits such that adjacent code words differ by one bit and does not involve adding additional bits to a data stream (i.e. Gray mapping has no overhead).

Figure 3:
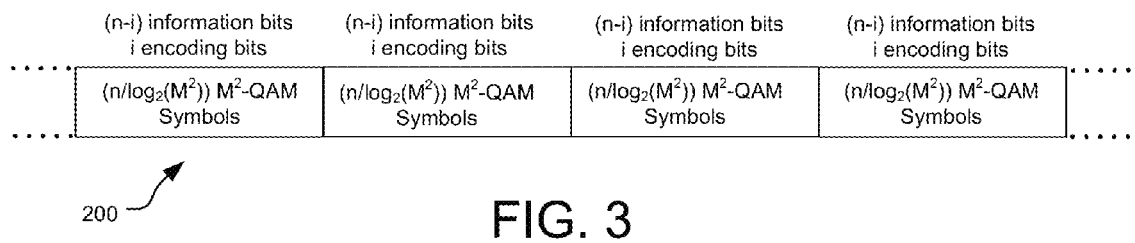
FIG. 3 diagrammatically illustrates a modulated output of an exemplary transmitter consistent with the present disclosure.

FIG. 3 diagrammatically illustrates the output of each of the transmitters TX1, TX2 ... TXN implementing a method 200 consistent with the present disclosure. As shown, at each transmitter, a different number, i, of encoding bits may be added to blocks of n-i bits to reduce the spectral efficiency of the transmitter compared to a maximum achievable spectral efficiency by an associated selected number of steps corresponding to the step size, 1/n. The blocks of n bits (n-i information bits plus i encoding bits) are then Gray mapped to $n/\log_2(M^2)$ associated $M^2$-QAM symbols and modulated on an optical carrier.

The encoding bits in a system or method consistent with the present disclosure may be parity bits or a combination of parity bits and constant value bits. Parity bits indicate, in a known manner, the parity of at least a portion of an associated block of n bits. As is known, a parity bit may be an even parity bit or an odd parity bit. When using even parity, the parity bit is set to a value of one if the number of ones in the bits (not including the parity bit) associated with the parity bit is odd. If the number of ones in the bits associated with the parity bit is already even, the even parity bit is set to a 0. When using odd parity, the parity bit is set to 1 if the number of ones in the bits (not including the parity bit) associated with the parity bit is even. When the number of ones in the in the bits associated with the parity bit is already odd, the odd parity bit is set to 0.

Constant value bits have a constant "1" or "0" value and may be included along with one or more parity bits to improve the power efficiency of the modulation, e.g. when adding additional parity bits has little or no additional benefit. Using the constant value bits lowers the average power per symbol in a system or method consistent with the present disclosure, which improves signal-to-noise ratio (SNR) performance when combined with maximizing the minimum Euclidean distance using parity bits. Also, depending on the location of the constant value bit(s) in a Gray mapped $M^2$-QAM symbol, the symbol is constrained to a specific group of constellation points. This constraint may be used by the receiver to demodulate the symbol.

Figure 4:
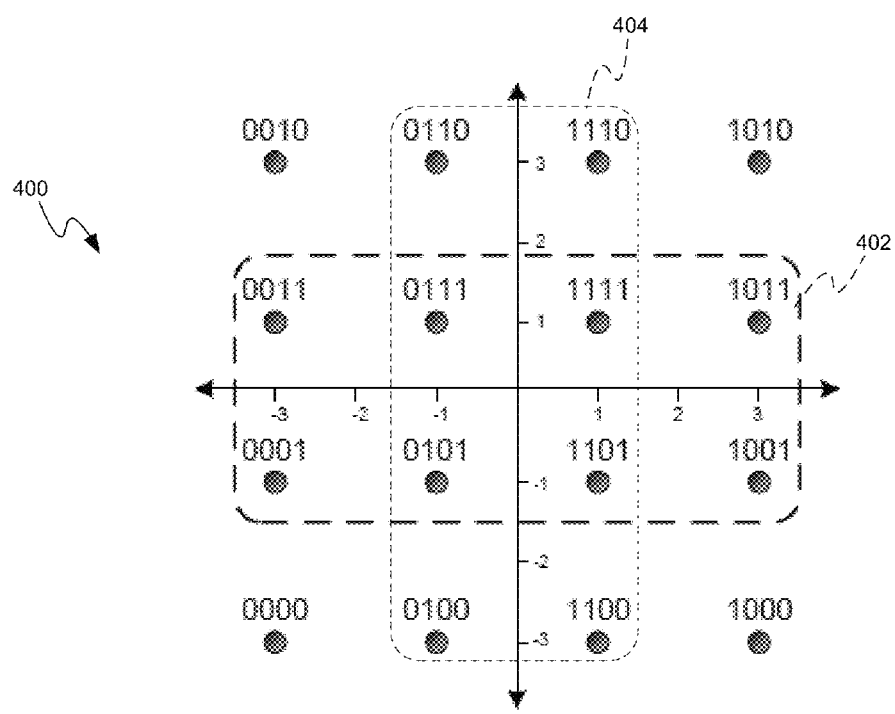
FIG. 4 is a constellation diagram illustrating constellation shaping using constant value bits consistent with the present disclosure.

FIG. 4, for example, includes a constellation diagram 400 illustrating Gray mapping of a 16-QAM signal. The constellation diagram 400 of FIG. 4 includes sixteen constellation points indicating the amplitude and phase of each QAM symbol that may be represented using a Gray mapped 16-QAM modulation format, along with the bits (code word) associated with the symbol. As shown, if the encoding bits include a constant value bit having a value of "1" placed in the least significant bit (LSB) position of a symbol having the modulation format shown in FIG. 4, then the constant value bit constrains the constellation point to be one out of the eight constellation points in the dashed rectangle 402. Likewise, if the encoding bits include a constant value bit having a value of "1" and placed in the second most significant bit (MSB) position of a symbol having the modulation format shown in FIG. 4, then the constant value bit constrains the constellation point to be one out of the eight constellation points in the dashed rectangle 404. If the encoding bits include two constant value bits, one having a value of "1" placed in the least significant bit (LSB) position and one having a value of "1" and placed in the second most significant bit (MSB) position, then the constant value bits constrain the constellation point to be one out of the four constellation points in the intersection between the dashed rectangles 402, 404.

FIGS. 5A-5E diagrammatically illustrate one example of a system and method consistent with the present disclosure using a 16-QAM format. Each of FIGS. 5A-5E illustrates a series of four 16-QAM constellation diagrams, each of which is associated with one of four consecutive QAM symbols provided at the output of an associated transmitter. Below each of the four constellation diagrams is an illustration of four bits that are mapped according to constellation diagram in the specific illustrated example. The letter "x" in a bit sequence identifies a bit that is not an encoding bit, e.g. an information bit, the letter P indicates an encoding bit that is a parity bit, and the number "1" indicates an encoding bit that is a constant value bit having a value of "1." Adjacent each of FIGS. 5A-5E is an indication of the step size and number of encoding bits for the illustrated example provided in the format of (n-i)/n. In one embodiment, for example, a plurality of transmitters in a WDM system may be configured to exhibit an output represented by a different one of FIGS. 5A-5E, whereby each of the transmitters has a different spectral efficiency.

In the illustrated example, a maximum achievable spectral efficiency (e.g. bit rate) may be specified and the required symbol rate and FEC overhead may be calculated. For the example, a maximum achievable spectral efficiency of 200 Gb/s may be specified with a 16-QAM as the base modulation format, 20% FEC overhead, 1% overhead for pilot symbols and 4.16% for protocol overhead. This example would require a symbol rate of 31.56 GBd.

Figures 5A, 5B, 5C:
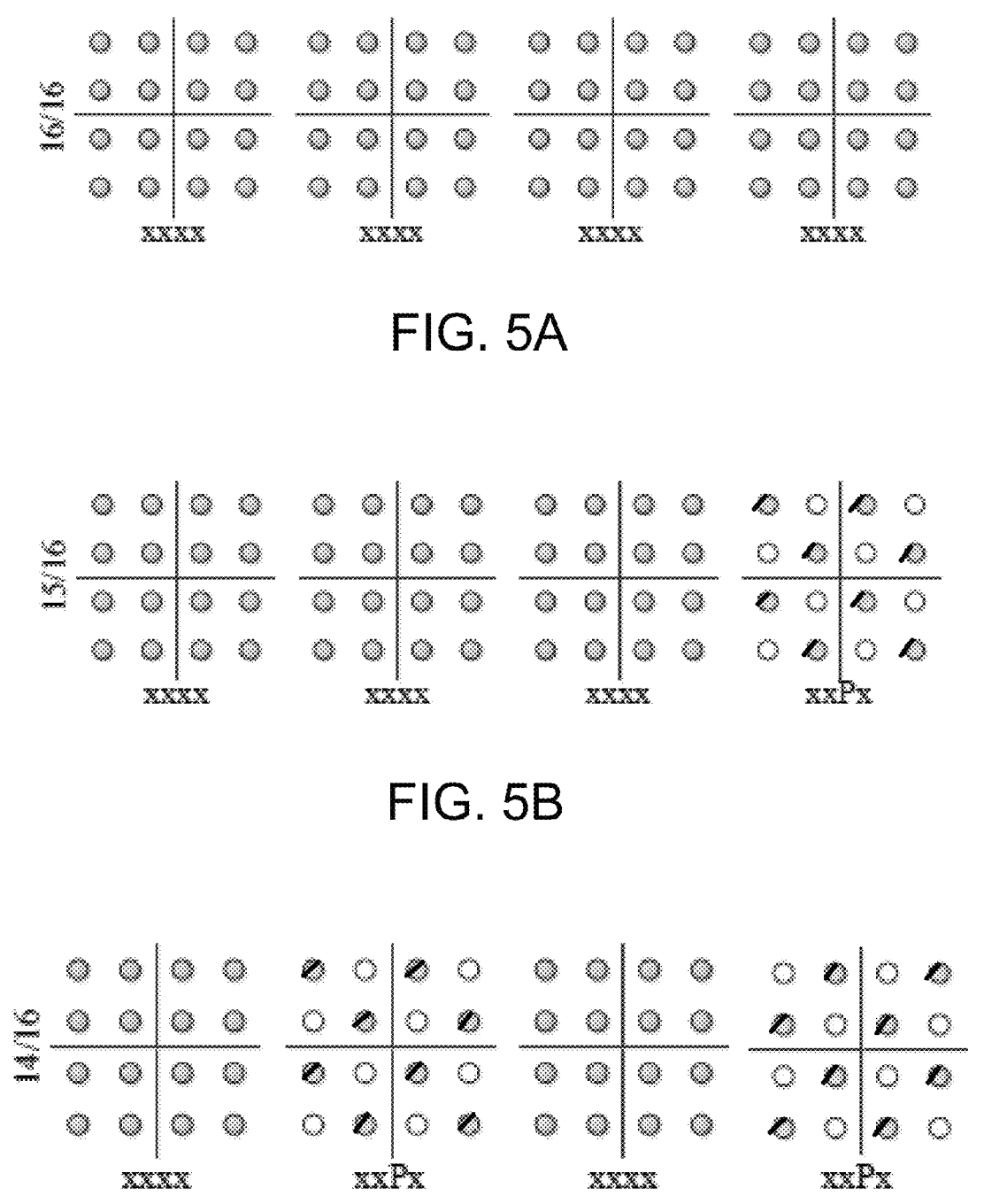

The desired step-size of choice for this example may be selected as 12.5 Gb/s, which is 1/16 of the maximum spectral efficiency of 200 Gb/s, i.e. n=16 in this example. With this step size, blocks of n=16 bits would be mapped to four (16/$\log_2 (4^2)$) associated 16-QAM symbols to achieve the maximum spectral efficiency. Each symbol is composed of in-phase and quadrature components. Hence, the illustrated example is 8-dimensional from coding perspective. FIG. 5A illustrates the output of a transmitter operating with the maximum spectral efficiency in this example since all of the bit locations in the four 16-QAM symbols are occupied by information bits, i.e. there are no encoding bits.

To reduce the spectral efficiency down one step from 200 Gb/s to 187.5 Gb/s, one encoding bit is used (n-i=15). As shown in FIG. 5B the one encoding bit may be a parity bit (P) provided in the $2^{nd}$ LSB of the fourth symbol. The parity bit in FIG. 5B effectively divides the fourth symbol into two groups of constellation points. Based on the value of the parity bit (odd/even), the selection of the allowed constellation point in the fourth symbol can be either from the light points, or the marked points. This grouping increases the minimum Euclidean distance between potential constellation points in the fourth symbol by $\sqrt{2}$, and effectively increase the overall minimum Euclidean distance of the symbol sequence consisting of the four symbols.

In a similar fashion, FIG. 5C shows a reduction of the spectral efficiency by two steps from 200 Gb/s to 175 Gb/s. To achieve a two-step reduction in spectral efficiency compared to the maximum spectral efficiency, two encoding bits in a block of sixteen bits are used for encoding bits that are parity bits. In particular, parity bits are provided in the $2^{nd}$ LSB of the second and fourth symbols of the sequence of four symbols shown in FIG. 5C.

Figure 5D:
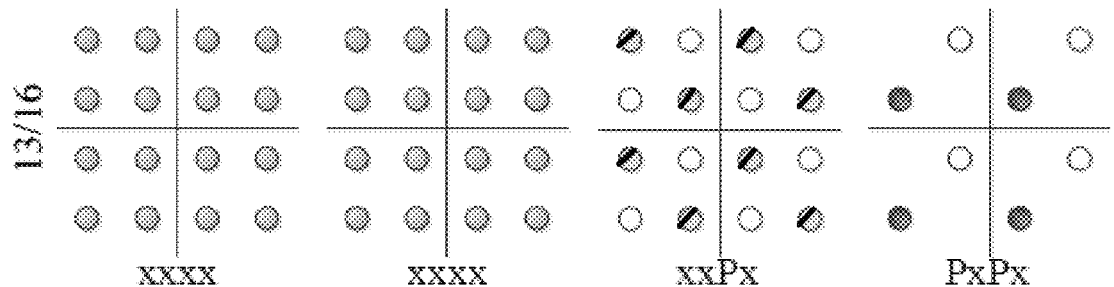

FIG. 5D shows a three step reduction of the spectral efficiency from the maximum spectral efficiency using three encoding bits that are parity bits. In FIG. 5D, parity bits are provided in the $2^{nd}$ LSB of the third and fourth symbol of the four symbol sequence, and in the MSB bit position of the fourth symbol. This configuration of parity bits constrains selection of the allowed constellation point in the third symbol to be either from the light points, or the marked points, and constrains the allowed constellation point in the fourth symbol to be either from the light points or the dark points.

Figure 5E:
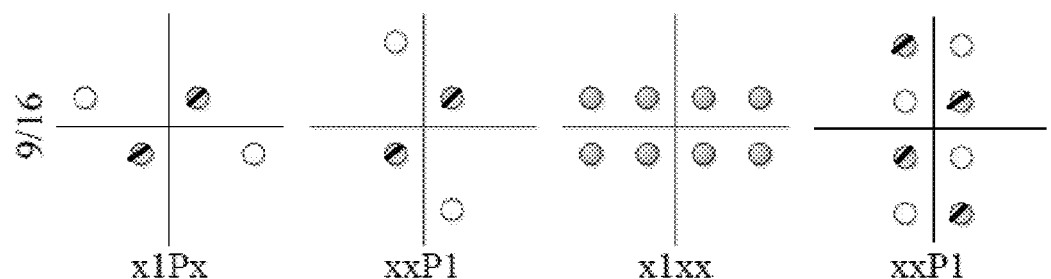

FIG. 5E shows a seven step reduction of the spectral efficiency from the maximum spectral efficiency (i.e. from 200 Gb/s to 112.5 Gb/s) using seven encoding bits including three parity bits and four constant value bits having a constant value of "1." In FIG. 5E, parity bits are provided in the 2nd LSB bit position of the first, second and fourth symbols of the four symbol sequence, and constant value bits are provided in the LSB bit position of the second and fourth symbols and the 2 MSB bit position of the first and third symbols. This configuration of parity and constant value bits constrains selection of the allowed constellation points for each symbol to the points illustrated in FIG. 5E.

Advantageously, a system and method consistent with the present disclosure may be configured to use any $M^2$-QAM modulation format to achieve a desired maximum spectral efficiency (bit or symbol rate) and step-size granularity. For example, doubling the maximum achievable spectral efficiency to 65.75 GBd (400 Gb/s) in a system based on modulation of blocks of n bits to four symbols (8 dimensional) and having the configuration as described in connection with FIGS. 5A-5D would double the spectral efficiency step size to 25 Gb/s. If a 10 Gb/s step-size granularity is desired using 16-QAM, then modulation consistent with the present disclosure would be based on a sequence of 5 symbols (10 dimensional). The increased number of symbols (dimensionality) increases the freedom in the design, e.g. by allowing smaller step-size granularity.

Figure 6:
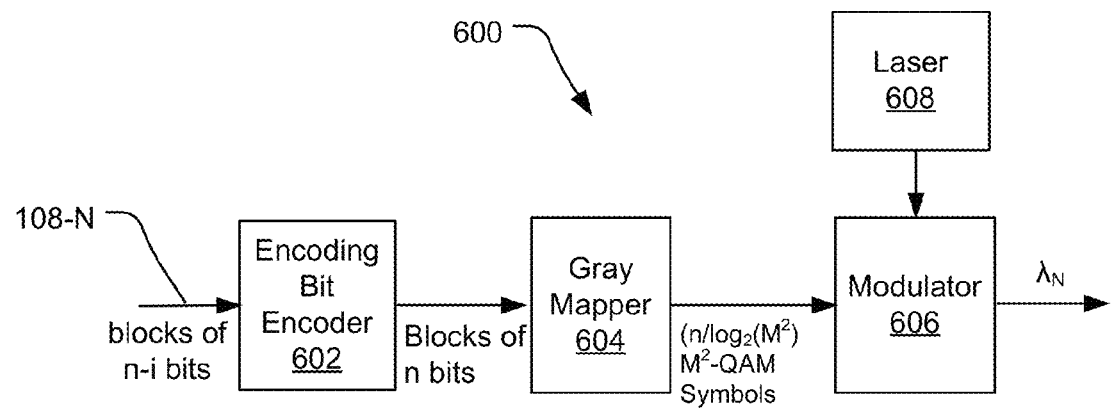
FIG. 6 is a block diagram of one exemplary embodiment of a transmitter consistent with the present disclosure.

FIG. 6 is a simplified block diagram of one exemplary transmitter 600 consistent with the present disclosure. The illustrated exemplary embodiment 600 includes an encoding bit encoder 602, a Gray mapper 604, and a modulator 606 for modulating the output of a continuous-wave laser 608 for providing a coded and modulated output on a carrier wavelength $\lambda_N$. The encoding bit encoder 602 may be configured to encode each block of n-i information bits (e.g. data bits, FEC overhead, pilot symbols) of a data stream provided on input path 118-N with i associated encoding bits to achieve a desired reduction in spectral efficiency, as described above. The output of the encoding bit encoder 602 includes successive blocks of n bits, i.e. n-i information bits plus i encoding bits.

The encoded output of the encoding bit encoder is coupled to the Gray mapper 604. The Gray mapper 604 is configured to map each block of n bits to $n/\log_2$ ($M^2$) associated $M^2$-QAM symbols. The QAM symbols associated with each block of n bits are modulated onto an optical carrier wavelength $\lambda_N$ of the continuous-wave laser 608 using the modulator 606. The modulator 606 may modulate the plurality of QAM symbols onto the carrier wavelength 4 using any known modulation method. The encoded, mapped and modulated output of the modulator 606 may be coupled to the multiplexer 112 (FIG. 1) in a WDM system.

Figure 7:
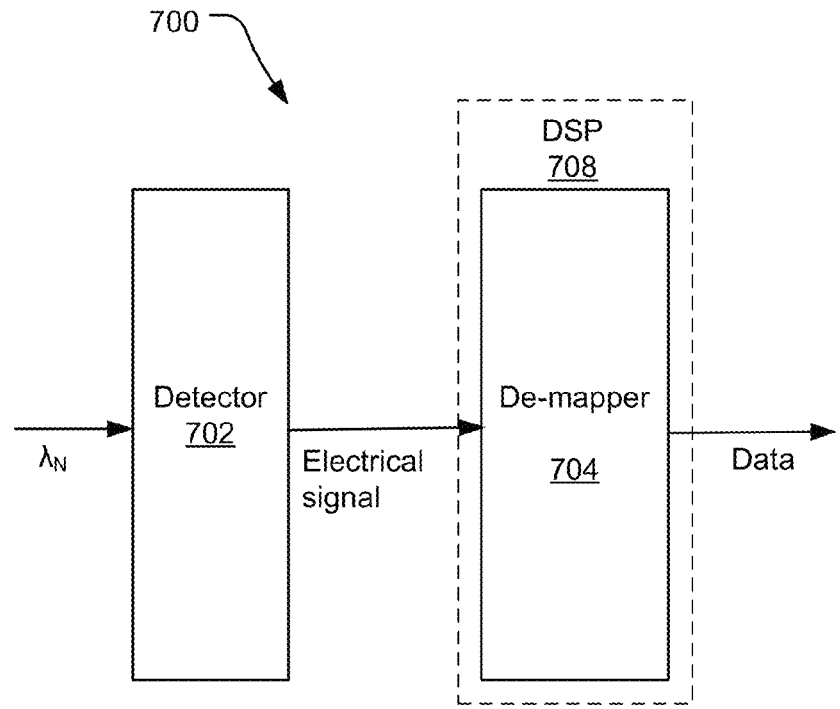
FIG. 7 is a block diagram of one exemplary embodiment of a receiver consistent with the present disclosure.

FIG. 7 is a simplified block diagram of one exemplary receiver 700 consistent with the present disclosure. The illustrated exemplary embodiment 700 includes an optical signal detector 702 and a de-mapper 704. The detector 702 may include a known coherent receiver, e.g. a polarization diversity coherent receiver, configured to receive the signal on the optical carrier wavelength $\lambda_N$ and convert the optical signal into one or more associated electrical outputs (e.g. an output associated with each polarization in a polarization multiplexed modulation format) representative of the QAM symbols modulated on the optical carrier wavelength $\lambda_N$ by the modulator 606 (FIG. 6).

The de-mapper 704 may be configured as a portion of a digital signal processing (DSP) circuit 708. In general, DSP involves processing of signals using one or more application specific integrated circuits (ASICS) and/or special purpose processors configured for performing specific instruction sequences, e.g. directly and/or under the control of software instructions. One example of a receiver incorporating a detector, i.e. a coherent receiver, and a DSP circuit using carrier phase estimation for processing the digital outputs of the coherent receiver is described in U.S. Pat. No. 8,295,713, the teachings of which are hereby incorporated herein by reference.

With reference to both FIGS. 6 and 7, the DSP circuit 708 may process the output of the detector 702 and provide an output that reproduces data provided at the input 108-N to the transmitter 600. The de-mapper 704 receives the electrical output of the detector 702, reverses the mapping applied by the Gray mapper 604, and removes the encoding bits applied by the encoding bit encoder 602. The output of the de-mapper is a de-mapped output representative of the successive blocks of n-i bits of data provided at the input 108-N to the transmitter 600.

De-mapping may be performed, for example using a maximum a posteriori (MAP) decoder, and may be performed iteratively in response to a priori log likelihood ratio (LLR) feedback from the output of the receiver. The de-mapper 704 in a system consistent with the present disclosure may cause correction of cycle slip using parity indicated by parity bits applied by the encoding bit encoder 602. In some embodiments, for example, the de-mapper 704 may use the parity bits to perform de-mapping in a manner that automatically causes correction of cycle slip.

Figure 8:
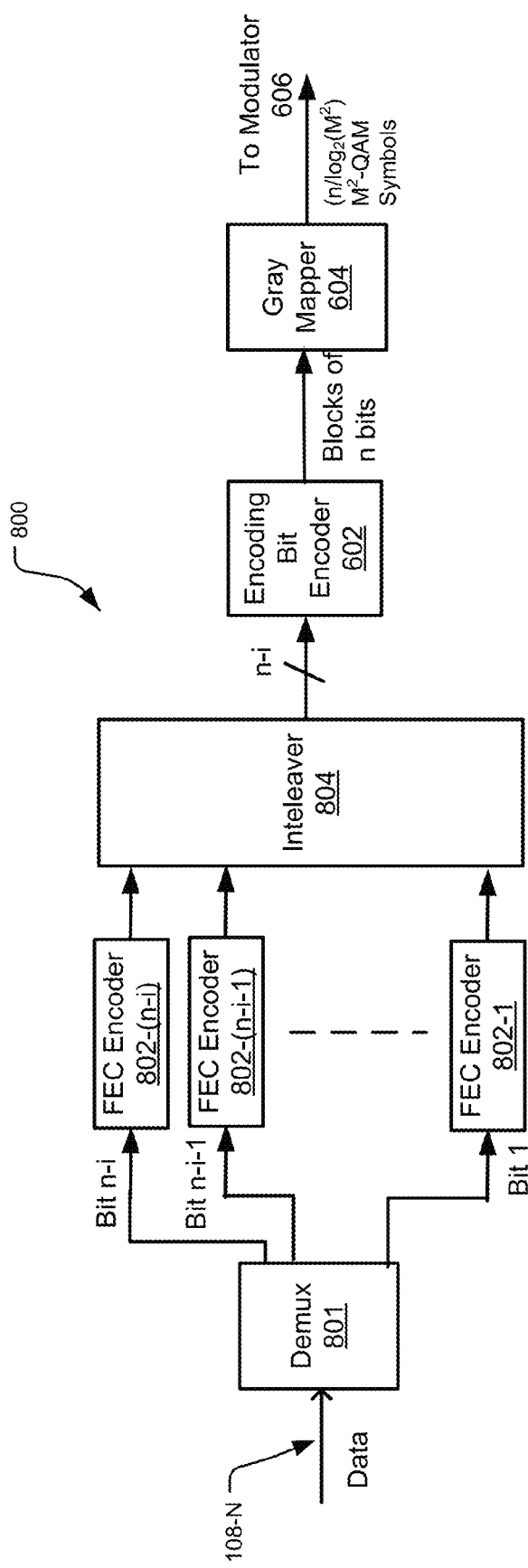
FIG. 8 is a block diagram of another exemplary embodiment of a transmitter consistent with the present disclosure.

A system consistent with the present disclosure may be implemented in a variety of configurations. FIG. 8 is a simplified block diagram of one exemplary transmitter 800 consistent with the present disclosure. The illustrated exemplary embodiment 800 includes a demultiplexer 801, a plurality of FEC encoders 802-($n$-$i$), 802-($n$-$i$-1) . . . 802-1, an interleaver 804, an encoding bit encoder 602, and a Gray mapper 604 for driving a modulator 606 as described in connection with FIG. 6.

The demultiplexer 801 may take a known configuration for receiving a serial input data stream on path 108-N and demultiplexing the input data stream into n-i separate parallel demultiplexed data streams. Each of the n-i data streams are coupled to an associated one of the FEC encoders 802-($n$-$i$), 802-($n$-$i$-1) . . . 802-1. The FEC encoders 802-($n$-$i$), 802-($n$-$i$-1) . . . 802-1 may each be configured to encode the data stream received thereby with an associated FEC code to provide an associated FEC encoded output.

Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), and low density parity check codes (LDPC). A LDPC code is a particularly useful code for the FEC encoders 802-($n$-$i$), 802-($n$-$i$-1) . . . 802-1 due to its low associated overhead. Hardware and software configurations for implementing various error correcting codes in the FEC encoders 802-($n$-$i$), 802-($n$-$i$-1) . . . 802-1 and corresponding decoders 802-($n$-$i$), 802-($n$-$i$-1) . . . 802-1 (FIG. 9) are known to those of ordinary skill in the art.

The encoded output of each of the FEC encoders 802-($n$-$i$), 802-($n$-$i$-1) . . . 802-1 is coupled to the interleaver 804. A variety of interleaver configurations are known. In the illustrated embodiment, the interleaver 804 receives n-i output code words from the FEC encoders 802-($n$-$i$), 802-($n$-$i$-1) . . . 802-1 and provides a parallel interleaved output of n-i bits to the encoding bit encoder 602.

As described above, the encoding bit encoder 602 may be configured to encode each block of n-i bits with i associated parity bits. The output of the encoding bit encoder 602 includes successive blocks of n bits, i.e. n-i information bits plus i parity bits. The encoded output of the encoding bit encoder 602 is coupled to the Gray mapper 604. The Gray mapper 604 is configured to map each block of n bits to $n/\log_2$ ($M^2$) associated $M^2$-QAM symbols. The QAM symbols associated with each block of n bits are provided to the modulator 606 for modulating the symbols onto an optical carrier wavelength 4 of a continuous-wave laser 608.

Figure 9:
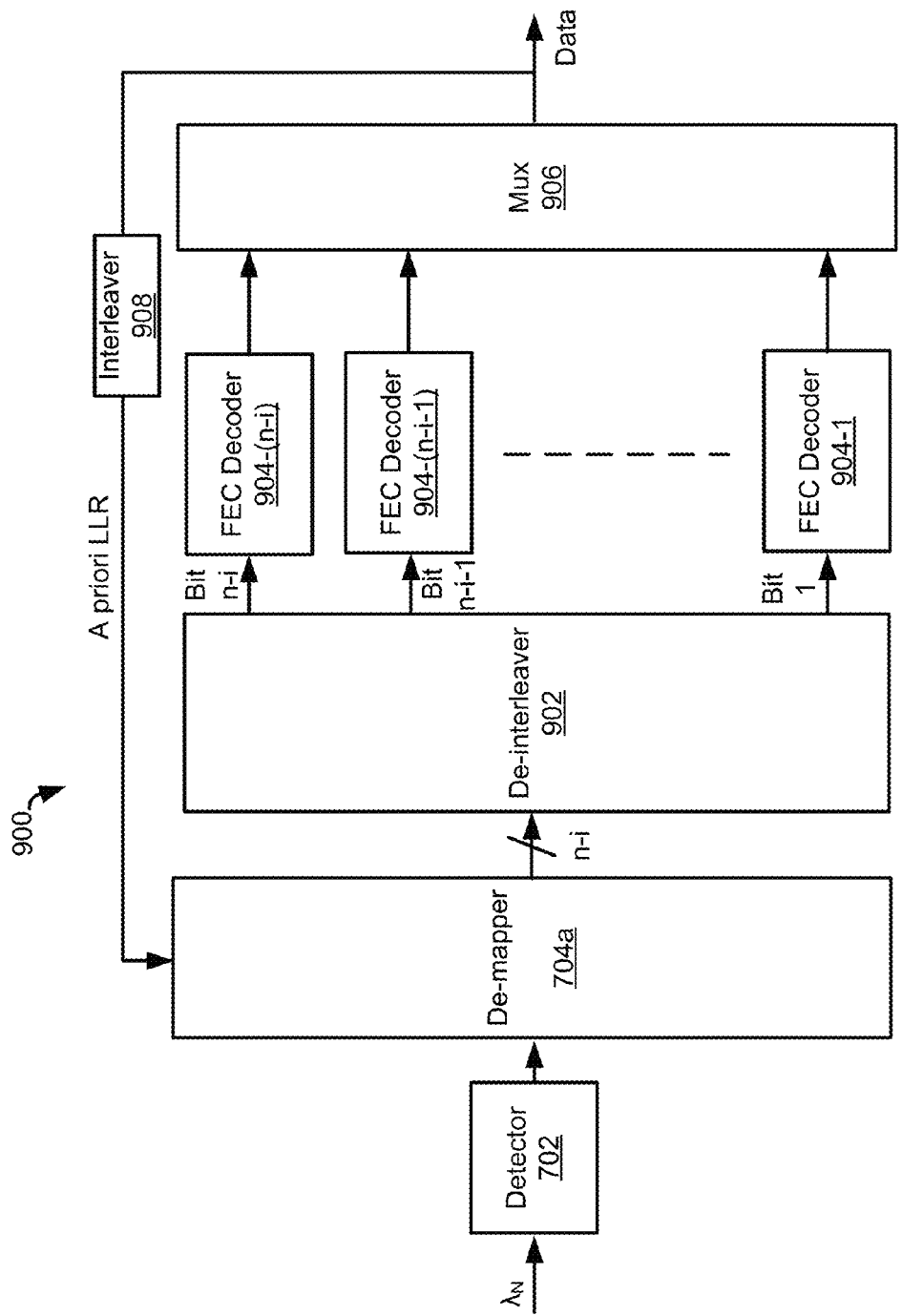
FIG. 9 is a block diagram of another exemplary embodiment of a receiver consistent with the present disclosure.

FIG. 9 is a simplified block diagram of one exemplary receiver 900 consistent with the present disclosure for receiving a signal modulated using the transmitter 800 shown in FIG. 8. The illustrated exemplary embodiment 900 includes a detector 702, a de-mapper 704$a$, a de-interleaver 902, a plurality of FEC decoders 904-($n$-$i$), 904-($n$-$i$-1) . . . 904-1, a multiplexer 906, and an interleaver 908.

As described above, the detector 702 is configured to receive the optical signal modulated on the carrier wavelength 4 and to convert the optical signal into an electrical signal. The de-mapper 704$a$ receives the output of the detector 702 and reverses the mapping of data to the modulation format imparted by the Gray mapper 604 at the transmitter and removes the encoding bits applied by the encoding bit encoder, e.g. using a MAP decoder as described above. As shown, de-mapping may be performed iteratively in response to a priori LLR feedback from the output of the receiver, i.e. the output of the multiplexer 906 in the illustrated embodiment. The de-mapper 704$a$ provides a de-mapper output including blocks of n-i bits, reproducing the output of the interleaver 804 in the transmitter 800.

The de-mapper output of the de-mapper 704a is coupled to the de-interleaver 902 which reverses the bit-interleaving performed by the associated interleaver 804 in the transmitter 800 and provides n-i associated de-interleaved outputs to the FEC decoders 904-(n-i), 904-(n-i-1) . . . 904-1. The FEC decoders 904-(n-i), 904-(n-i-1) . . . 904-1 may each be configured to decode the data stream received thereby using the FEC code applied at the transmitter 800 to provide associated FEC decoded outputs. The n-i FEC decoded outputs of each of the FEC decoders 904-(n-i), 904-(n-i-1) . . . 904-1 are coupled to a known multiplexer 906. The multiplexer 906 multiplexes outputs of the FEC code decoders 904-(n-i), 904-(n-i-1) . . . 904-1 to produce a serial digital data output that reproduces the data on path 118-N at the transmitter 800.

The data output of the multiplexer 906 is fed back to the de-mapper 704a through the interleaver 908 to provide a priori LLR information used by the de-mapper 704a in decoding the input thereto. The interleaver 908 essentially reverses the de-interleaving performed by the de-interleaver 902.

The encoding bit encoder 602 in a system consistent with the present invention may insert parity bits and/or encoding bits at any bit position within a mapped QAM symbol, and the de-mapper 704, 704a may be configured to de-map the received signal based on the location and/or parity associated with the encoding bits. Also, any parity bit encoded by the encoding bit encoder may identify parity of any associated portion of a block of n bits.

Figure 10A:
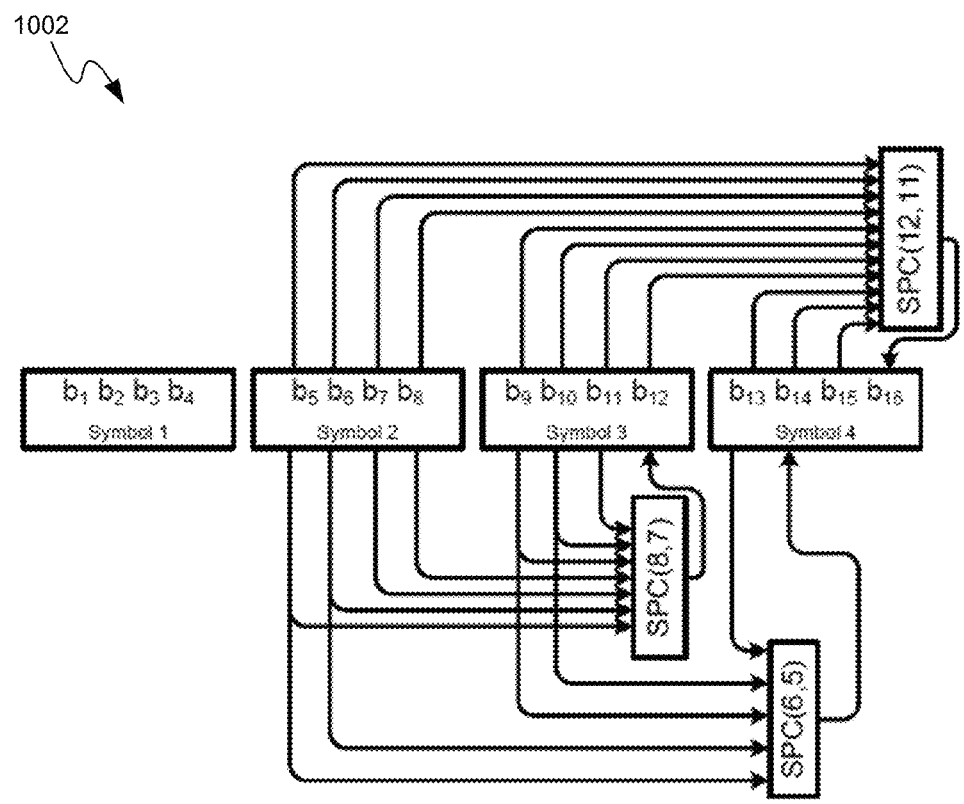
FIGS. 10A and 10B diagrammatically illustrate examples of bit location and values of encoding bits consistent with the present disclosure.

FIG. 10A, for example, is diagrammatic illustration 1002 of a block of sixteen bits (b1, b2 . . . b16) provided in four 16-QAM symbols (symbol 1 . . . symbol 4), with three encoding bits (i=3) provided as parity bits. The parity bits in FIG. 10A are single parity check (SPC) bits indicating parity of different associated bits within the block of sixteen bits. In particular, a first parity bit is provided at the LSB bit position of symbol 3 ($b_{12}$) to indicate parity of $b_5$-$b_{11}$. A second parity bit is provided at the second MSB bit position of symbol 4 ($b_{14}$) to indicate parity of $b_5$, $b_6$, $b_9$, $b_{10}$ and $b_{13}$. A third parity bit is provided at the LSB bit position of symbol 4 ($b_{16}$) to indicate parity of $b_5$-$b_{15}$.

Figure 10B:
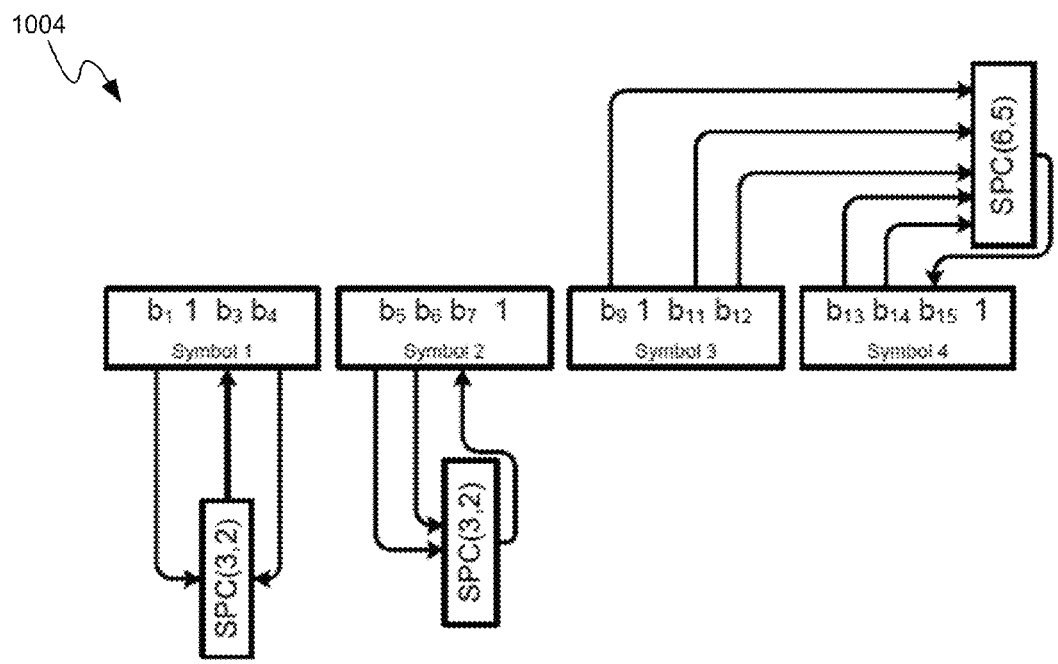

FIG. 10B is diagrammatic illustration 1004 of a block of sixteen bits (b1, b2 . . . b16) provided in four 16-QAM symbols (symbol 1 . . . symbol 4), with seven encoding bits (i=7) consisting of three single parity check bits and four constant value bits having a value of "1." In the illustrated embodiment, constant value bits are provided in the LSB bit positions of symbols 2 and 4, and in the second MSB bit position of symbols 1 and 3. A first parity bit is provided at the second LSB bit position of symbol 1 ($b_3$) to indicate parity of $b_1$ and $b_4$. A second parity bit is provided at the second LSB bit position of symbol 2 ($b_7$) to indicate parity of $b_5$ and $b_6$. A third parity bit is provided at the second LSB bit position of symbol 4 ($b_{15}$) to indicate parity of $b_9$ and $b_{11}$-$b_{14}$.

Figure 11:
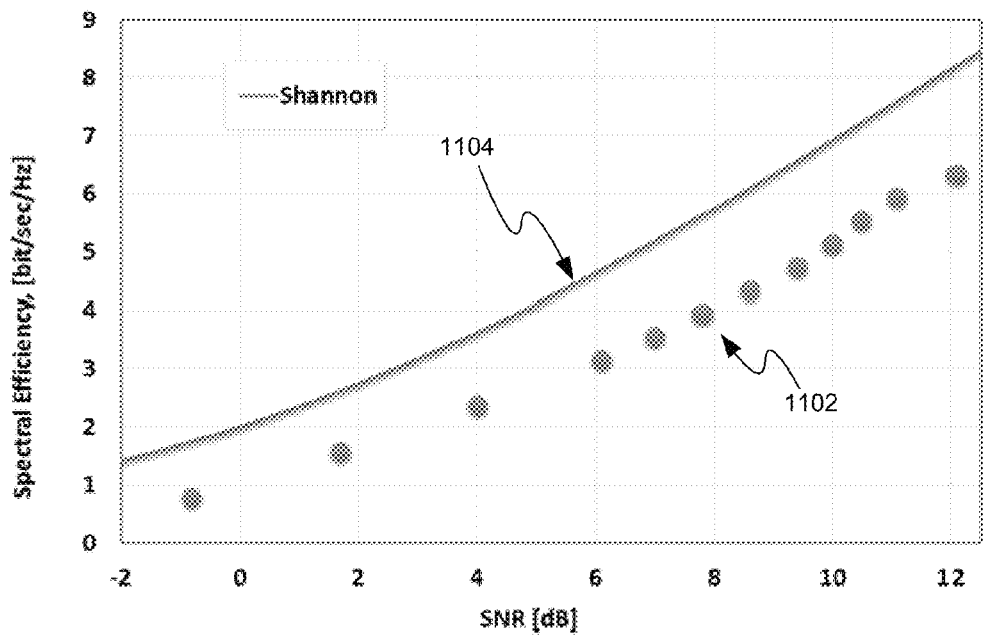
FIG. 11 is a plot of SNR vs. spectral efficiency illustrating performance of an exemplary system consistent with the present disclosure.
Figure 12:
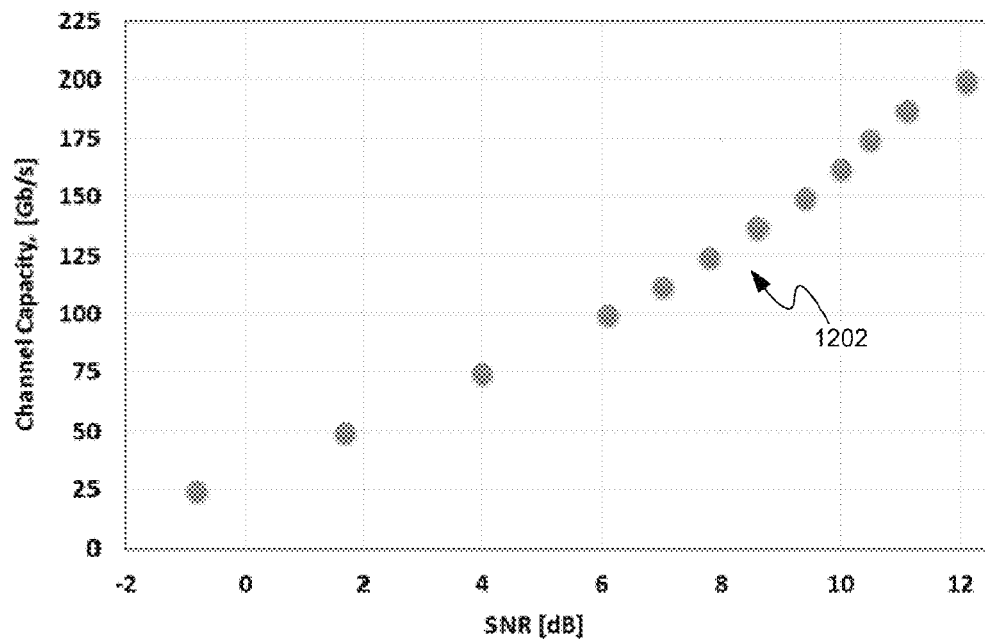
FIG. 12 is a plot of SNR vs. channel capacity illustrating performance of an exemplary system consistent with the present disclosure.

Performance of a system and method consistent with the present disclosure and including the parameters described above in connection with FIG. 5 is illustrated in connection with FIGS. 11 and 12. FIG. 11 includes plots 1102 of SNR vs. spectral efficiency (bits/sec/Hz) associated with twelve different spectral efficiency steps and also includes a plot 1104 illustrating the Shannon limit. FIG. 12 includes plots 1202 of SNR vs. channel capacity (Gb/sec) associated with the same twelve spectral efficiency steps plotted in FIG. 11. As shown, performance of any selected spectral efficiency in a system consistent with the present disclosure generally follows the Shannon limit plot 1104.

According to one aspect of the disclosure there is provided a method of providing variable spectral efficiency for a plurality of transmitters in an optical communication system, the method including: selecting a maximum spectral efficiency at which each of the plurality of transmitters may transmit data on the optical communication system; selecting an $M^2$-QAM modulation format used by the plurality of transmitters for transmitting the data at the maximum spectral efficiency; selecting a desired standard step size by which the maximum spectral efficiency may be reduced, the standard step size being 1/n of the maximum spectral efficiency, wherein n is a positive integer multiple of $\log_2 (M^2)$; and for each of the plurality of transmitters, selecting an associated number, i, of standard steps for reducing the spectral efficiency associated with the transmitter; encoding successive blocks of n-i bits with i encoding bits to provide successive blocks of n bits; Gray mapping each of the successive blocks of n bits to $n/\log_2 (M^2)$ QAM symbols having the $M^2$-QAM modulation format; and modulating the plurality of QAM symbols on an optical carrier wavelength to provide an associated modulated optical signal.

According to another aspect of the disclosure, there is provided a system including a plurality of optical signal transmitters, each of the optical signal transmitters being configured to modulate data using an $M^2$-QAM modulation format. Each of the transmitters includes: an encoding bit encoder configured to encode successive blocks of n-i bits with a selected number, i, of encoding bits to provide successive blocks of n bits; a Gray mapper coupled to the encoding bit encoder and configured to map each one of the blocks of n bits to $n/\log_2 (M^2)$ quadrature amplitude modulated (QAM) symbols having the $M^2$-QAM modulation format; and a modulator coupled to the Gray mapper and configured to modulate an optical signal in response to an output of the Gray mapper to provide a modulated optical signal including the QAM symbols.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of providing variable spectral efficiency for a plurality of transmitters in an optical communication system, said method comprising:
   selecting a maximum spectral efficiency at which each of said plurality of transmitters may transmit data on said optical communication system;
   selecting an $M^2$-QAM modulation format used by said plurality of transmitters for transmitting said data at said maximum spectral efficiency;
   selecting a desired standard step size by which said maximum spectral efficiency may be reduced, said standard step size being 1/n of said maximum spectral efficiency, wherein n is a positive integer multiple of $\log_2(M^2)$; and
   for each of said plurality of transmitters,
      selecting an associated number, i, of standard steps for reducing said spectral efficiency associated with said transmitter;
      encoding successive blocks of n-i bits with i encoding bits to provide successive blocks of n bits;
      Gray mapping each of said successive blocks of n bits to $n/\log_2(M^2)$ QAM symbols having said $M^2$-QAM modulation format; and
      modulating said plurality of QAM symbols on an optical carrier wavelength to provide an associated modulated optical signal.

2. A method according to claim 1, wherein said number, i, of standard steps is a different number for at least two of said plurality of transmitters.

3. A method according to claim 1, wherein said i encoding bits comprises at least one parity bit indicating parity of at least a portion of said n bits.

4. A method according to claim 1, wherein said i encoding bits comprises at least one bit having a predetermined constant value.

5. A method according to claim 1, wherein said i encoding bits consists of a first number of parity bits indicating parity of at least a portion of said n bits and a second number of predetermined bits having a predetermined constant value.

6. A method according to claim 1, wherein said $M^2$-QAM modulation format is a 16-QAM modulation format.

7. A system comprising:
   a plurality of optical signal transmitters, each of said optical signal transmitters being configured to modulate data using an $M^2$-QAM modulation format and each of said transmitters comprising:
      an encoding bit encoder configured to encode successive blocks of n-i bits with a selected number, i, of encoding bits to provide successive blocks of n bits;
      a Gray mapper coupled to said encoding bit encoder and configured to map each one of said blocks of n bits to $n/\log_2(M^2)$ quadrature amplitude modulated (QAM) symbols having said $M^2$-QAM modulation format; and
      a modulator coupled to said Gray mapper and configured to modulate an optical signal in response to an output of said Gray mapper to provide a modulated optical signal comprising said QAM symbols.

8. A system according to claim 7, wherein said number, i, of encoding bits is a different number for at least two of said plurality of transmitters.

9. A system according to claim 7, wherein said i encoding bits comprises at least one parity bit indicating parity of at least a portion of said n bits.

10. A system according to claim 7, wherein said i encoding bits comprises at least one bit having a predetermined constant value.

11. A system according to claim 7, wherein said i encoding bits consists of a first number of parity bits indicating parity of at least a portion of said n bits and a second number of predetermined bits having a predetermined constant value.

12. A system according to claim 7, wherein said $M^2$-QAM modulation format is a 16-QAM modulation format.

* * * * *